United States Patent [19]

Mitchell et al.

[11] 4,183,138
[45] Jan. 15, 1980

[54] APPARATUS FOR CUTTING VEGETATION

[75] Inventors: Albert W. Mitchell; Donald M. Woods, both of Houston, Tex.

[73] Assignee: Weed Eater, Inc., Houston, Tex.

[21] Appl. No.: 884,508

[22] Filed: Mar. 8, 1978

[51] Int. Cl.² .............................................. A01G 3/06
[52] U.S. Cl. ........................................ 30/276; 56/12.7
[58] Field of Search ................... 30/276, 347; 56/12.7, 56/295

[56] References Cited
U.S. PATENT DOCUMENTS 4,020,552  5/1977  Mizuno .................. 30/276

FOREIGN PATENT DOCUMENTS 852150  7/1977  Belgium ........................ 30/276

*Primary Examiner*—Jimmy C. Peters

[57] ABSTRACT

Apparatus for cutting vegetation with a rotating head carrying non-metallic cutting line extended into a cutting plane. Additional line is extended into the cutting plane by pushing a ball member against the ground while rotating the head. The ball member moves inwardly for releasing a spool carrying coiled cutting line to rotate a predetermined angular displacement in the head. After the cutting line length is extended, the spool is secured automatically against further rotation within the head. A cover is releasably secured to the head by a twist-lock connection to allow the ball member and spool to remove from the head for rewinding, etc. Rotation of the spool within the head is regulated by uniform interlocking, straight teeth that are rugged, long wearing and provide positive control without any possibility of the spool "free wheeling" in the head.

9 Claims, 7 Drawing Figures

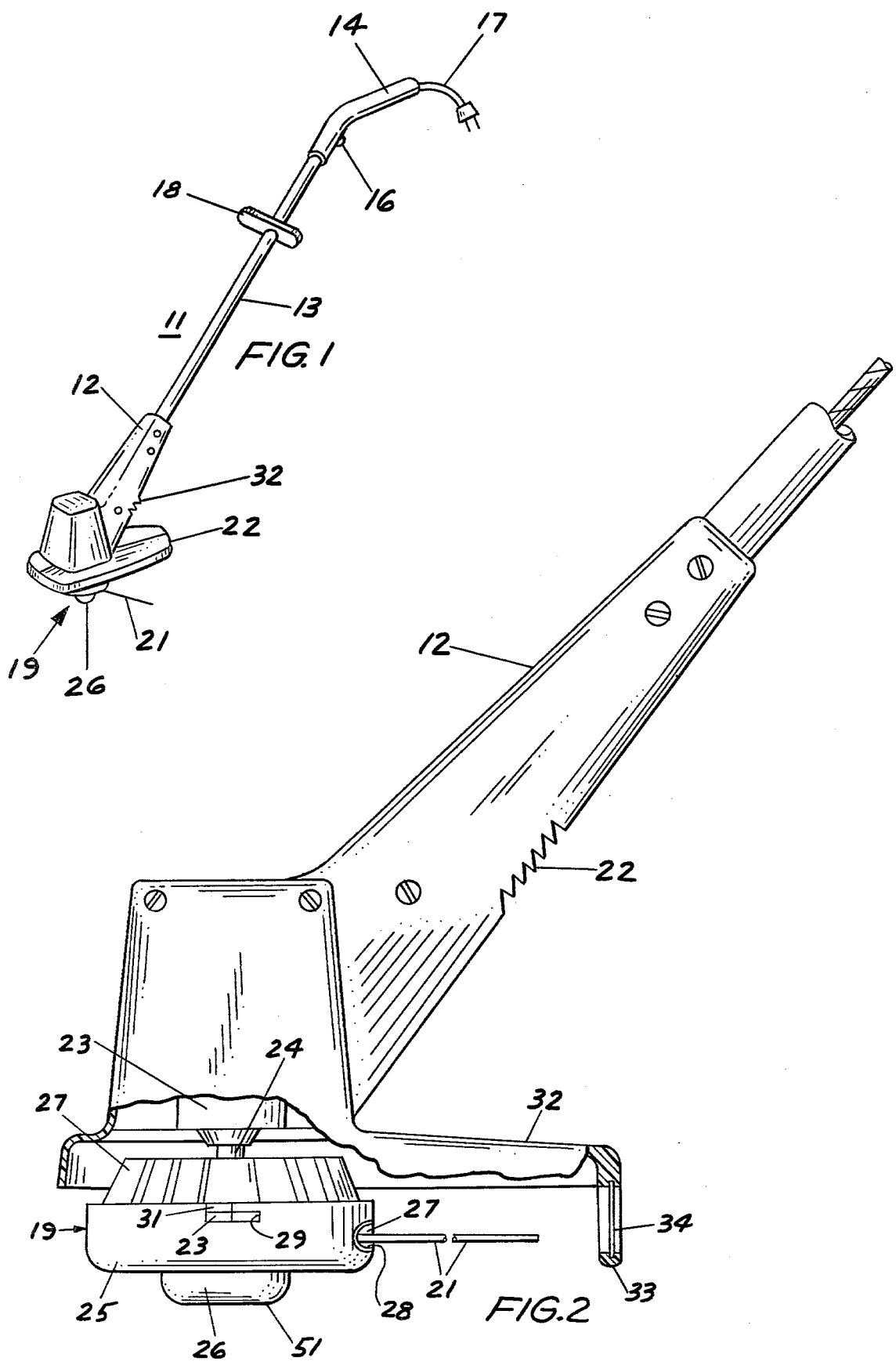

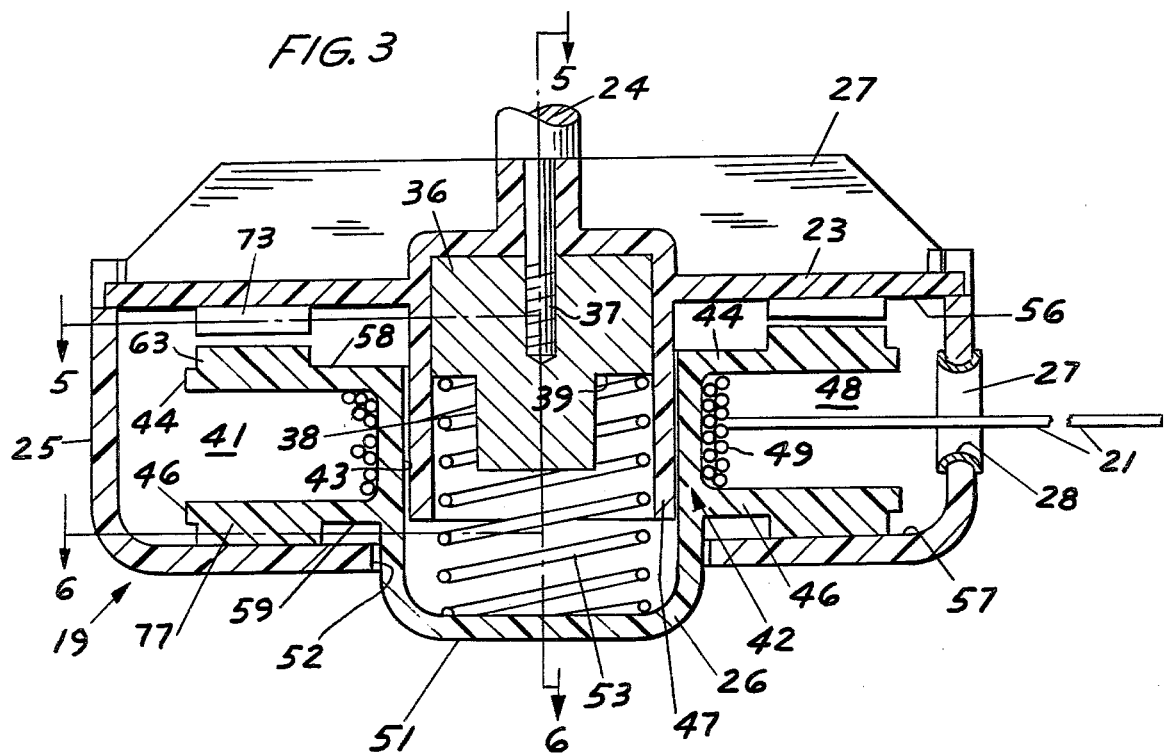

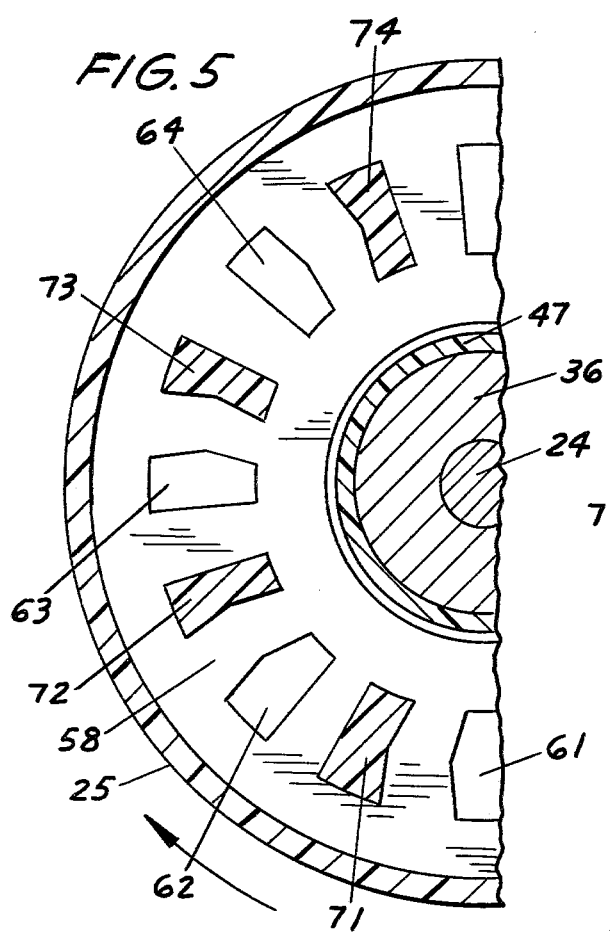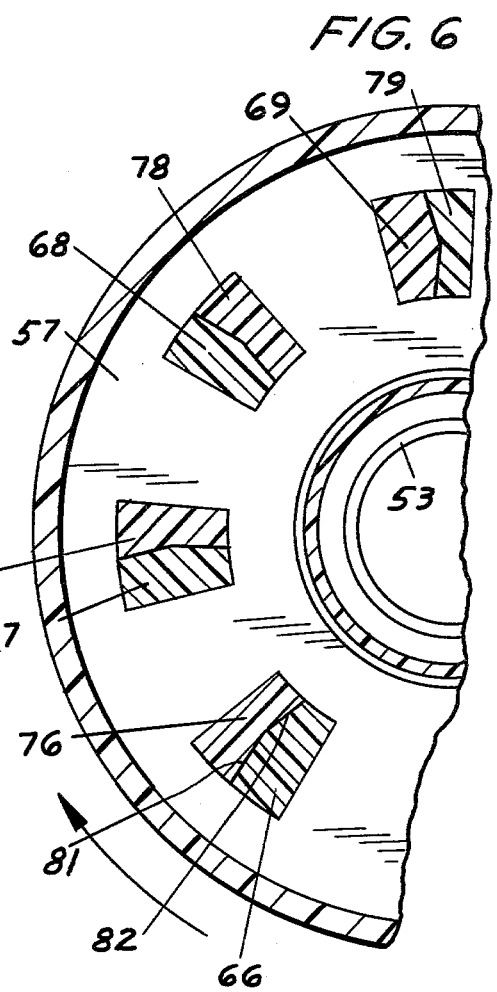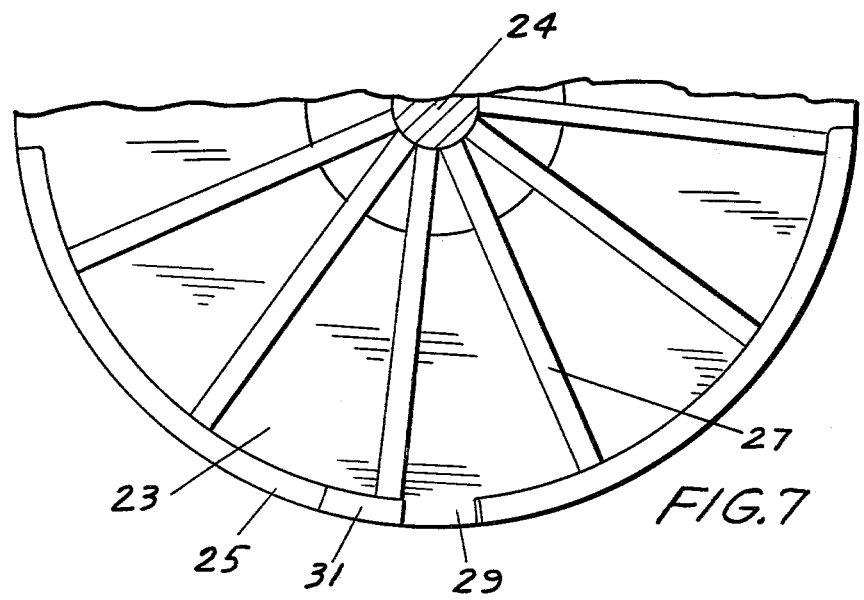

APPARATUS FOR CUTTING VEGETATION

BACKGROUND OF THE INVENTION

1. Field of the Invention

This invention relates to the cutting of vegetation, and more particularly, it relates to the cutting of vegetation using a flexible, non-metallic cutting line extending from a rotating head into a cutting plane.

2. Description of Prior Art

Various types of devices have been proposed for many years to facilitate the removal of vegetation by mowing, trimming, edging and like cutting operations. In general, these devices have employed a metal blade to effect vegetation removal. Devices of this nature employ prime movers such as electric and gasoline motors. As a result, rotating metal blades can inflict serious and terrible injury upon the user.

In about 1960, there was developed in Europe a trimmer/edger unit employing a flexible polymeric line extending from a rotating head for cutting vegetation. This unit did not work properly because of several defects in structure and operating parameters. In the United States of America, practical vegetation cutting devices using flexible, non-metallic lines carried upon a rotating head were developed. The devices are shown in U.S. Pat. Nos. 3,708,967, 3,826,068 3,859,776, 4,035,912, 4,052,789 and 4,054,992. These patented devices have met outstanding success in that these American developments are probably the safest electrical or gasoline-powered tools yet invented for vegetation cutting, edging and trimming operations.

The devices shown in these patents employ a flexible cutting line, such as manufactured from Nylon ® polymer. The cutting line is carried usually upon a spool internally of a rotating head. When desired to replenish the line or to extend an additional length of it, the rotation of the head was stopped and line manually extended from the spool. This line extension procedure in the patented devices has been found to be convenient, simple and reliable. In many of the more powerful devices, especially those powered by d.c. electric motors, a system to extend the cutting line from the head without interrupting cutting operations was desired. The present invention is a device for cutting vegetation in the nature of the patented devices, wherein a durable and reliable, positive clutch-like mechanism is employed for extending selectively, the cutting line in a certain length from the head. More particularly, this novel apparatus is easy to operate, rugged in construction and has no complicated mechanisms. A ball member on the head is depressed while the head is rotating. The line is pulled by centrifugal force from an internal spool released for rotation a certain angular displacement in the head. The spool is under positive control before, during and after the cutting line is extended. At no time can the spool "free wheel" in the head. Other unique features of the present invention will be apparent from the following description.

SUMMARY OF THE INVENTION

In accordance with this invention, there is provided an apparatus for cutting vegetation which has a head rotatable about an axis of rotation. The head carries upper and lower planar clutch surfaces. A spool is carried on the head and journaled for rotation about the rotational axis and adapted to move axially against a biasing means from a first station to a second station. The spool has upper and lower planar clutch surfaces. A flexible, non-metallic cutting line is coiled about the spool and has a free end extending outwardly of the head into a cutting plane. A ball member is mounted for axial movement and extends axially from the head. A plurality of uniform and angularly spaced straight teeth are carried on the clutch surfaces of the head and spool. The teeth provide selective rotation of the spool in a predetermined angular displacement within the head in response to the ball member moving the spool between the first and second stations. Rotation of the spool feeds a certain length of cutting line from the rotating head into the cutting plane. Then, the spool is secured positively against rotation within the head.

DESCRIPTION OF THE DRAWINGS

FIG. 1 is a pictorial view illustrating one embodiment of the apparatus for cutting vegetation arranged according to the present invention;

FIG. 2 illustrates in enlargement the lower portion of the apparatus shown in FIG. 1;

FIG. 3 is a vertical section, in enlargement, taken through the cutting head of the apparatus shown in FIG. 2.

FIG. 4 is a vertical section of the cutting head as shown in FIG. 3 but with the spool in cutting line extension condition;

FIG. 5 is a partial cross section of the head shown in FIG. 3 and taken on line 5—5;

FIG. 6 is a partial cross section of the head shown in FIG. 3 and taken on line 6—6; and FIG. 7 is a partial plan and cross-section of FIG. 4 taken along line 7—7, showing air vanes and twist-lock cover mounting on the head.

DESCRIPTION OF SPECIFIC EMBODIMENTS

Referring to FIG. 1 there is shown an apparatus for cutting vegetation, which is constructed in accordance with one embodiment of the present invention. In this particular embodiment, the apparatus is a grass trimmer 11, but it could be a lawnmower, edger or other device for vegetation cutting purposes. The trimmer 11 has a lower housing 12 interconnected by a tube 13 to a handle assembly 14. The assembly 14 provides a switch 16 for selectively applying electrical power received by a cord 17 to an electrical motor carried within the housing 12. For two-handed operation of the trimmer 11, an auxiliary handle 18 is provided upon the tube 13. The lower housing 12 carries a head 19 rotatable about an axis passing through the housing 12 and extends the cutting line 21 into a cutting plane which is substantially perpendicular to the axis of rotation of the head.

In FIG. 2, there is shown an enlargement of the housing 12 carrying a plurality of air induction openings 22. These openings introduce a flow of cooling air over the prime mover contained in the housing 12. The housing 12 includes an electric motor 23 which has a downwardly-extending drive shaft 24. The head 19 is threadedly connected to the shaft 24 by an integral adapter. The upper surface of the head 19 may be surrounded by a plurality of vanes 27 serving as a centrifugal blower for moving air radially outwardly from the head 19 during its rotation. As a result, the induced flow of air cools the motor 23 within the housing 12. The head 19 includes a hub 23, a cover 25 and button or ball member 26. The hub carries in its side peripheral surface an aperature 27 through which the cutting line 21 extends radially outwardly into the cutting plane. A metal bearing or grommet 28 encircles the aperture 27 and protects the line 21 against undue wear and breakages. The cover 25 is releasably secured to the hub 23. A twist-lock interconnection may be used which includes a lug 29 on the hub and a "L" notch 31 on the cover.

The housing 12 includes a rearwardly-extending tail part 32 which serves as a protection to the user to prevent inadvertent contact with the rotating cutting line 21. Also, the tail part provides an automatic limit to the extension of the cutting line 21 from the head 19. More particularly, the tail part 32 has a downwardly-extending projection 33 in which is embedded a metal cutting blade 34. As a result, the cutting line 21 rotated in a cutting plane by the head 19 can never have an operating length greater than the distance from the axis of rotation to the cutting blade 34. Any greater length of cutting line is automatically severed by the blade 34.

The head 19 as seen in FIG. 3, is disc-like with a smooth peripheral side surface carrying the aperture 27 through which the cutting line 21 extends into the cutting plane. If more than one cutting line is used, each line should have a separate aperture and bearing surface. The hub 23 on one face carries integrally an adapter 36 in which the drive shaft 24 is secured by threads 37. In addition, the adapter 36 extends axially a sufficient dimension in the head 19 to form a rigid and integral connection with the shaft 24. Preferably, the adapter 36 is cylindrical with its lower terminus 38 having a flat circular shoulder 39.

The hub 23 forms a cylindrical cavity in cooperation with a cylindrical cover 25. A spool 42 is disposed within the cavity 41. Preferably the spool 42 is integral with the ball member 26. The spool 42 is mounted for independent rotation about the rotational axis and also axial movement within the head 19. For this purpose, the spool has spaced-apart planar flanges 44 and 46, and a central axial opening 43 to receive cylindrical post member 47 on the hub 23. The flanges 44 and 46 have circular peripheries and define a line storage area 48. As a result, the spool 42 is journaled snugly upon cylindrical post member 47 for both rotation and axial movement on the rotational axis of the head.

The spool 42 is wound with the cutting line 21 contained in several layers 49 between the flanges 44 and 46. The interior end of the coiled cutting line 21 is secured to the spool 38. The free end of the cutting line 21 extends outwardly of the head 19 through the aperture 27. Preferably, the cutting line 21 is wound upon spool 42 counterdirectionally to the rotation of the head 19 during vegetation cutting. This line winding arrangement avoids backlash problems relative to the unintended uncoiling of cutting line on the spool 42 when rotation is suddenly reduced.

The exposed surfaces of the head 19, and especially the ball member 26 extend axially along the cover 25 in smooth surfaced contour rounded at the edges and without substantial projections and recesses capable of trapping appreciable vegetation. Preferably, the exposed surface 51 of the ball member 26 is circular with rounded corners and coaxially aligned with the axis of rotation of the head 19. Also, the ball member 26 closely fits into a central opening 52 in the cover 25. A spring 53 is seated against the shoulder 39 and the ball member 26. Thusly, the spool 42 in normal operation is biased into an outward or first station position. The ball member 26 can move the spool 42 axially into an inward or second station position as seen in FIG. 4.

The spool 42 fits loosely in a telescoped relationship over the cylindrical post member 47. The looseness in fit of these parts can increase appreciably during repeated line extensions from the head 19. However, these telescoping elements do not need any special close tolerances in axial or angular bearing functions in the present head. Close bearing tolerances are not required by the unique and rugged mechanisms for locking the spool within the head and for selectively releasing the spool to undergo a certain angular displacement required for a predetermined line extension from the head.

The ball member 26 and spool 42 together move axially along the rotational axis as a unit from the outward station of FIG. 3 to the inward station of FIG. 4 when cutting line 21 is extended by rotation of the spool 42 relative to the hub 23. For this purpose, it is preferred to have the head 19 rotating at operative speeds and press the ball member 26 against the ground to move the ball member to its inward position as seen in FIG. 4. The spool 42 is now released, by novel locking elements, to rotate relative to the hub 23 and extend cutting line 21 into the cutting plane. These locking elements have a unique form (1) that secures the spool to the hub when the ball member is in the outward station; (2) when the ball member is moved to the inward station, that release the spool to rotate within the hub through a predetermined angular displacement for extending a certain length of cutting line from the head into the cutting plane, and then; (3) secures the spool against any further rotation relative to the hub. This functioning is obtained reliably even though the spool may be relatively loose while rotating and moving axially in the hub 23. The novel locking elements resemble the positive clutch mechanism of the straight toothed type which interlocks with long straight extending teeth surfaces of uniform height in compression for great strength and ruggedness.

The hub 23 and cover 25 have planar clutch surfaces 56 and 57, respectively normal to the rotational axis. Also, the spool 42 has planar clutch surfaces 58 and 59 upon the flanges 44 and 46 respectively normal to the rotational axis. Thus, clutch surfaces 56 and 58 and 57 and 59 face one another in parallel relationship. A plurality of uniform and angularly spaced straight teeth of uniform height are carried on these clutch surfaces. Further, these teeth overlap axially when the spool 42 is moved axially between the first and second stations. Also, these teeth are offset angularly so that the spool 42 rotates relative to the head 19 when the spool is moved from the first station to the second station.

A plurality of pentagonal-shaped straight teeth forming a preferred arrangement are shown in FIGS. 3,4,5 and 6. For example, the clutch surface 56 carried eight uniform and angularly spaced upper teeth of which only teeth 71–74 are shown. The clutch surface 57 carries a lower group of similar eight teeth of which only teeth 66–69 are shown. However, the teeth 66–69 are angularly offset one-half the tooth spacing between the teeth 71–74.

The clutch surfaces 58 and 59 on the spool 42 each carry eight similar uniform and angularly spaced teeth of which only teeth 61–64 and 76–79 are shown, respectively. The teeth on both clutch surfaces 58 and 59 are axially and radially aligned.

With the ball member 26 at the outward station of FIG. 3, the spool has teeth 76–79 engaging the teeth 66–69 on the clutch surface 57 of the cover 25. Also, the spool teeth 61–64 are spaced axially a small distance from the teeth 71-74 on the clutch surface 56 of the hub 23.

With the trimmer 11 pressed against the ground during operation, the ball member 26 moves into the inward station of FIG. 4 the spool teeth 61-64 move angularly into abutment with the teeth 71-74 of the hub 23 after the spool has rotated the certain angular displacement or offset between the teeth 71-74 and 66-69. These teeth now secure the spool against rotation relative to the head 19. Raising the trimmer 11 causes the spool 42 to be moved axially to its outward station in the head 19 as is shown in FIG. 3. Now, the teeth 76-79 engage the teeth 66-69 after the spool 42 has rotated again a prescribed angular displacement relative to the offset between the teeth 71-74 and 66-69. Thereby, a certain length of cutting line 21 has been extended from the head 19 and then, the spool is secured to the head 19 against further unintended rotation. The spool has been rotated in the hub a predetermined angular displacement with the ball member and spool moving from the outward station to the inward station, and back again to the outward station. As a result, a certain length of cutting line 21 has been unwound from the rotated spool 42 and extended from the head 19.

The straight teeth carried on the clutch surfaces should be uniform in height although the height may not be identical for all groups of teeth 61-64, 66-69, 71-74, and 76-79. It is preferred that the teeth have a height or axial dimension such that adjacent teeth remain axially overlapped when the spool 42 is between the first and second station. In this arrangement, a very loose fitting spool 42 cannot free wheel in the head 19 during extension of cutting line.

Best results are obtained when all the teeth are substantially identical in size and shape (both angular and axial and radial directed dimensions). Preferably, the teeth have abutting side surfaces which are smooth and aligned in lines parallel to the rotational axis of the head 19. Also, these side surfaces between engaged teeth should not be straight along lines normal to the rotational axis of the head 19. For example in FIG. 6, the teeth 66-69 on clutch surface 57 and the teeth 76-79 on cluch surface 59 have such special side surfaces (e.g., wedge-shaped surfaces 81 and 82 on teeth 66 and 76). These unique teeth engage over their entire presented faces under comprehensive loading and self align the teeth in radial position. Since the clutch surfaces are all normal to the rotational axis of the head 19, these straight teeth always are in near complete abutment over their top and bottom surfaces with the clutch surfaces to self align coaxially the spool and head.

As a unique result of the special side surfaces 81 and 82 of the straight teeth, the spool and head are automatically aligned radially upon the common axis of rotation.

The surfaces 81 and 82 are shown in the teeth of FIGS. 5 and 6 to be configured as a pentagon so that the abutting side surfaces are chisel or wedge-shaped with the apex thereof at a common diameter relative to the spool and head.

Other radially self aligning side surface shapes besides the pentagon can be used, such as polygons of triangles, hexagons, etc. Also, these side surfaces 81 and 82 may be complementary intersected curves such as semicylindrical surfaces. The only requirement of these side surfaces is that they are complementary and not completely flat or straight along lines normal to the rotational axis of the spool 42 and head 19. How, ever these side surfaces may have straight portions along lines parallel to the rotational axis of the spool and head. Thus, the loose fit of the spool 42 on the cylindrical part member 47 of the hub 23 is not critical because of the unique locking elements provided by the self aligning clutch surface and specially-shaped, straight teeth. Stated in another manner, the "positive clutch" action of these locking elements provides a rugged and long lasting system to regulate rotation of the spool 42 in the head 19. If eight uniformly spaced teeth are used as each clutch surface, the angular spacing between adjacent teeth is 45 degrees, and the offset between teeth in 22.5 degrees. The spacings between the teeth, for best results gives line extensions of between one half and one and one half inches. Preferably, the cutting line 21 is extended about one inch when the spool 42 completes its predetermined rotation within the head 19. These stated line extension dimensions produce good workings of the head 19 and allow excellent dimensional arrangements of the teeth upon the clutch surfaces.

The locking mechanism of the present apparatus may be activated by (1) stopping the rotation of the head; (2) manually moving the ball member to the inward position; (3) pulling upon the cutting line; (4) releasing the ball member to allow the spool to complete its rotation while yet pulling upon the cutting line; and (5) releasing the ball member to allow the spool to complete its rotation while yet pulling upon the cutting line 21. Preferably, the operation is preformed (with the electric motor 23 rotating the head 19) by the operator pressing the ball member to its inward station against the ground. Then, the operator raises the head 19 slightly from the ground to remove contact of the ball member with the earth's surface. Now, the ball member returns to its outward station. As a result, the extension of the cutting line 21 is completed very simply and automatically by the novel structure employed in the trimmer 11.

The cover 25 can be releasably secured to the hub 23 by any system. Preferable, a twist-lock arrangement is used. For this purpose as shown in FIGS. 1 and 7, the hub 23 carries one or more lugs 29. The interior surface 84 of the cover 25 carries "L" shaped openings to allow the lugs axially to enter the cover as it is slipped about the hub 23. The cover 25 is rotated on the hub 23 so that the lugs slide into the horizontal part of the "L" shaped notch 31 and secure the cover and hub into an integral assembly. Preferably, the cover rotates to lock the lugs into notch 31 counterdirectionally to the direction in which the head 19 rotates during operation. Thus, vibrations during head rotation cannot loosen the cover from the hub 23.

Although the head 19 in all its elements may be formed of metal, plastic or other material, it is preferred to use rather inexpensive polymeric materials which are readily fabricated by high-speed molding operations. The spool 38 can carry sufficient cutting line 21 (e.g., 0.065-0.100 inch in diameter Nylon ® polymer) for several years' vegetation cutting before requiring a new supply of cutting line. When desired, the cover 25 is readily removed from the hub 23 and the spool 42 rewound or replaced with another having a fresh supply of the cutting line 21.

From the foregoing description, it will be apparent that there has been provided a novel apparatus for cutting vegetation which provides a convenient and safe method of extending cutting line as desired by the operator. It will be understood that certain changes or alterations in the present apparatus may be made without departing from the spirit of this invention. These changes are contemplated by and are within the scope of the appended claims which define the invention. Additionally, the present description is intended to be taken as an illustration of this invention.

What is claimed is:

1. An apparatus for cutting vegetation, comprising;
   a. disc-like hub rotatable about an axis of rotation with an open face;
   b. a cylindrical cover releasably secured to said hub and carrying a peripheral aperture;
   c. said hub and cover carrying upper and lower planar clutch surfaces normal to the axis;
   d. a spool journaled for rotation on said hub about said rotational axis and mounted between said hub and cover for axial movement against a biasing means from a first station to a second station, and said spool having upper and lower planar clutch surfaces normal to the axis;
   e. a circular ball member operatively connected to said spool and mounted within said cover for axial movement therein, and said ball member extending at least partially from said cover to be accessible for manual activation;
   f. at least one flexible non-metallic cutting line coiled on said spool and having a free end extending outwardly from said cover through said aperture into a cutting plane;
   g. a plurality of uniform, angularly spaced straight teeth having planar surfaces normal to the axis carried on said upper and lower planar clutch surfaces of said spool, hub and cover;
   h. said straight teeth on said clutch surfaces arranged in an overlapping relationship when said spool is moved intermediate said first and second station;
   i. said straight teeth forming a locking means with interfitting radial alignment surfaces for the selective rotation of said spool to a predetermined angular displacement on said hub and cover by said ball member moving said spool between the first and second stations whereby a certain length of cutting line is extended from said cover into said cutting plane; and
   j. said teeth engaging each other and said clutch surfaces for aligning axially and radially said spool and said head with the axis.

2. The apparatus of claim 1 wherein said teeth on said spool, hub and cover are spaced in offset relationship whereby said spool is freed to move angularly a certain displacement related to the offset in said teeth when said spool is moved between the first and second stations.

3. The apparatus of claim 1 wherein said teeth are substantially identical and have interfitting side surfaces that are wedge-shaped.

4. The apparatus of claim 1 wherein said cover is secured to said hub by a twist-lock connection released by twisting counter directionally to the rotation of said hub during the cutting of vegetation.

5. An apparatus for cutting vegetation, comprising:
   a. a head rotatable about an axis of rotation, said head having a peripheral aperture and upper and lower planar clutch surfaces normal to the axis at the ends of a coaxial-aligned cylindrical cavity formed within said head;
   b. a spool journaled for rotation within said cavity on said head about the rotational axis and said spool mounted within said cavity for axial movement against a biasing means from a first station to a second station, and said spool having upper and lower planar clutch surfaces normal to the axis;
   c. circular ball member operatively connected to said spool and axially movable on said head with said ball member extending axially from said head;
   d. at least one flexible non-metallic cutting line coiled on said spool and having a free end extending outwardly from said head through said aperture into a cutting plane;
   e. a plurality of uniform, angularly-spaced teeth having planar surfaces normal to the axis and carried on said upper and lower planar clutch surfaces of said head and said spool and said teeth having interfitting and abutting straight side surfaces aligned in parallel to the rotational axis;
   f. said teeth arranged in an overlapping relationship on said planar clutch surfaces of said head and said spool for providing locking means for selectively rotating said spool a predetermined displacement on said head during rotation of said head by said ball member moving said spool between the first and second stations whereby a certain length of cutting line is extended from said head into said cutting plane with said teeth engaged at least partially during movement of said spool;
   g. said teeth having said abutting side surfaces non-linear along lines normal to the rotational axis thereby forming a radially self-aligning internested structure whereby said teeth engage each other and said clutch surfaces for aligning axially and radially said spool and said head with the axis.

6. The apparatus of claim 5 wherein said straight teeth on said clutch surfaces of said spool and head are equal height and reside in axial overlapping relationship when said spool has been moved intermediate said first and second station.

7. The apparatus of claim 6 wherein said teeth on said spool and head are spaced in angularly offset relationship whereby said spool is freed to move angularly only a certain displacement related to the offset in said teeth when said spool is moved between the first and second stations.

8. The apparatus of claim 5 wherein said teeth on said spool and said head are substantially identical and have said side surfaces as portions of a pentagon.

9. The apparatus of claim 5 wherein said teeth have internested side surfaces which have a wedge-shaped configuration forming an apex thereof at a common diameter relative to said spool and head.

* * * * *